(12) United States Patent
Fukata

(10) Patent No.: US 8,621,053 B2
(45) Date of Patent: Dec. 31, 2013

(54) FIRMWARE UPDATE APPARATUS AND PROGRAM

(75) Inventor: Ayumi Fukata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 650 days.

(21) Appl. No.: 12/882,044

(22) Filed: Sep. 14, 2010

(65) Prior Publication Data

US 2011/0072423 A1 Mar. 24, 2011

(30) Foreign Application Priority Data

Sep. 18, 2009 (JP) .................................. 2009-217896
Sep. 18, 2009 (JP) .................................. 2009-217897

(51) Int. Cl.
*G06F 15/177* (2006.01)

(52) U.S. Cl.
USPC ............ 709/222; 709/203; 709/223; 717/168

(58) Field of Classification Search
USPC ............... 709/203, 222, 223; 713/1; 717/168, 717/170, 171, 172, 174, 176–178
See application file for complete search history.

(56) References Cited

U.S. PATENT DOCUMENTS

| | | | |
|---|---|---|---|
| 7,073,017 B2 * | 7/2006 | Yamamoto | 711/103 |
| 7,272,711 B2 * | 9/2007 | Suda et al. | 713/100 |
| 7,334,117 B2 * | 2/2008 | Wilson et al. | 713/1 |
| 2001/0047514 A1 * | 11/2001 | Goto et al. | 717/11 |
| 2003/0028899 A1 | 2/2003 | MacInnis | |
| 2004/0205745 A1 | 10/2004 | Piazza | |
| 2008/0056514 A1 | 3/2008 | Ito | |
| 2008/0189693 A1 | 8/2008 | Pathak | |
| 2009/0063611 A1 | 3/2009 | Igarashi | |

FOREIGN PATENT DOCUMENTS

JP 2008-017084 1/2008

OTHER PUBLICATIONS

European Search Report mailed Aug. 2, 2011, for EP 11165805.0, eight pages.

* cited by examiner

*Primary Examiner* — Frantz Jean
(74) *Attorney, Agent, or Firm* — Morrison & Foerster LLP

(57) ABSTRACT

In a firmware update apparatus, a reference device specification part specifies one of a plurality of audio processing devices as a reference device. A version number acquisition part acquires version numbers of firmwares stored in the audio processing devices. A matching table storage stores a matching table defining a combination of compatible version numbers of firmwares. An incompatible device display part performs display for specifying an audio processing device that stores a firmware that does not satisfy compatibility defined in the matching table with a firmware stored in the reference device. An update target type selection part specifies a firmware update target device type from among a plurality of device types. A firmware update instruction part transmits an update command instructing update of the firmware to one or more of audio processing devices belonging to the firmware update target device type selected by the update target type selection part.

7 Claims, 10 Drawing Sheets

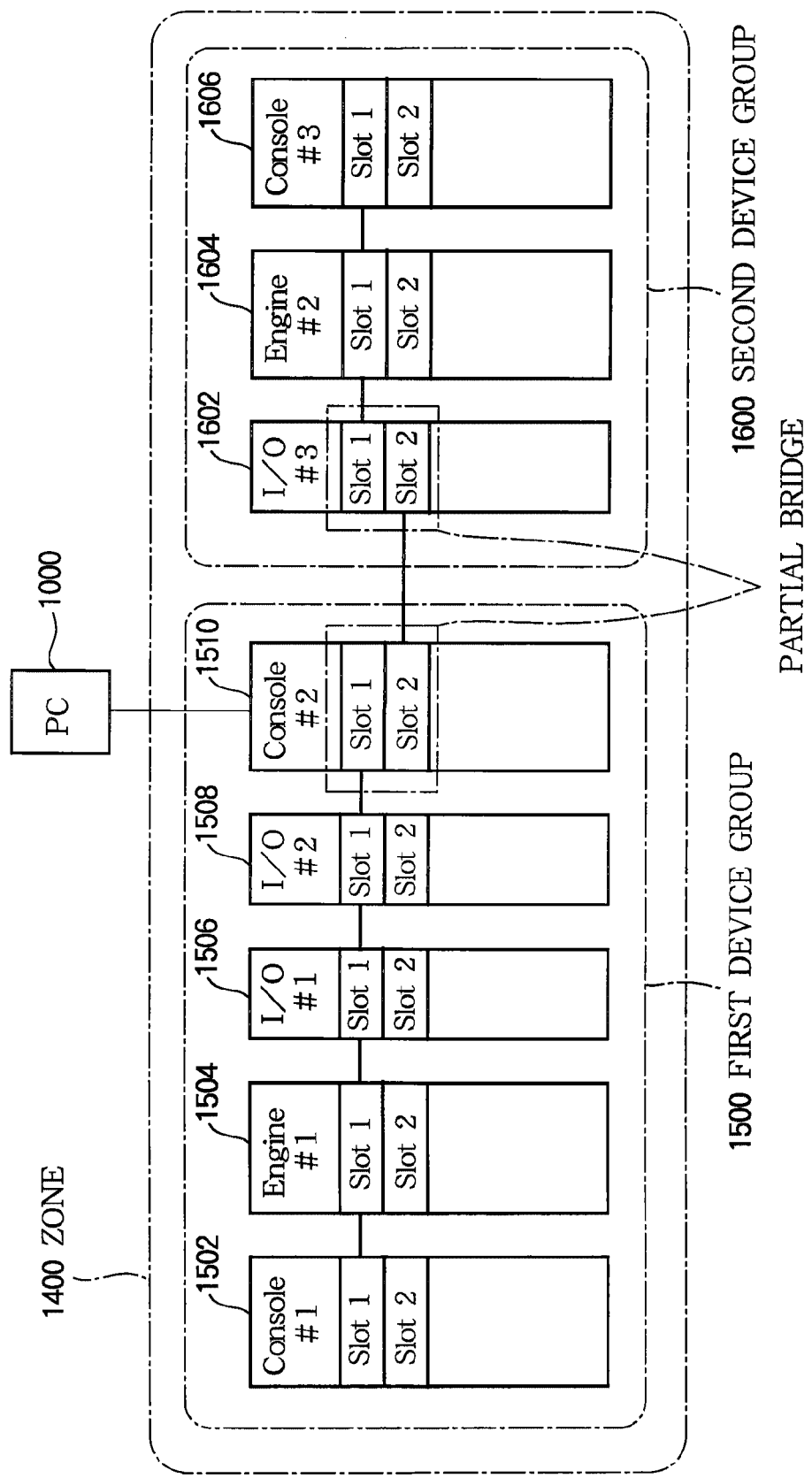

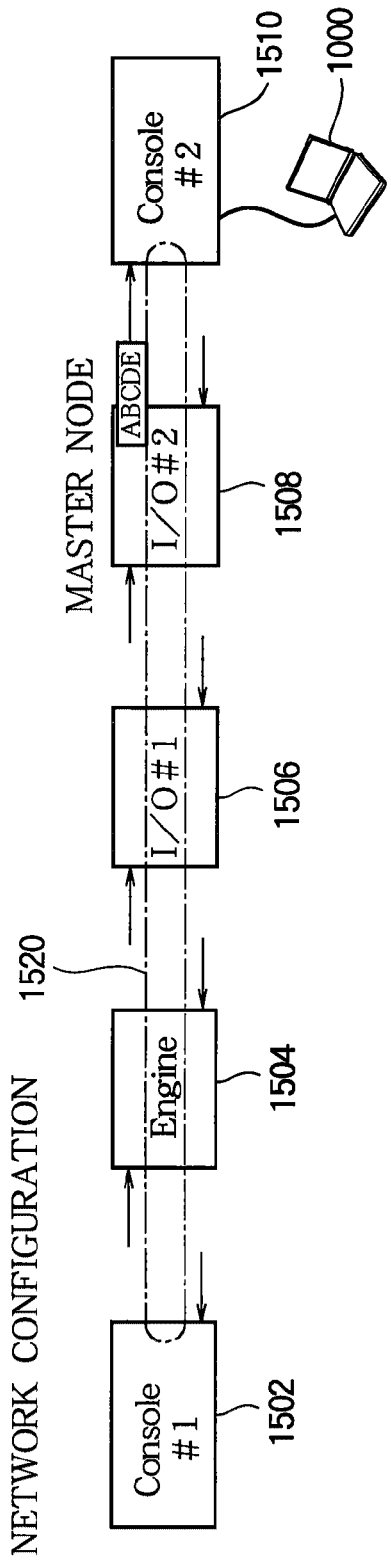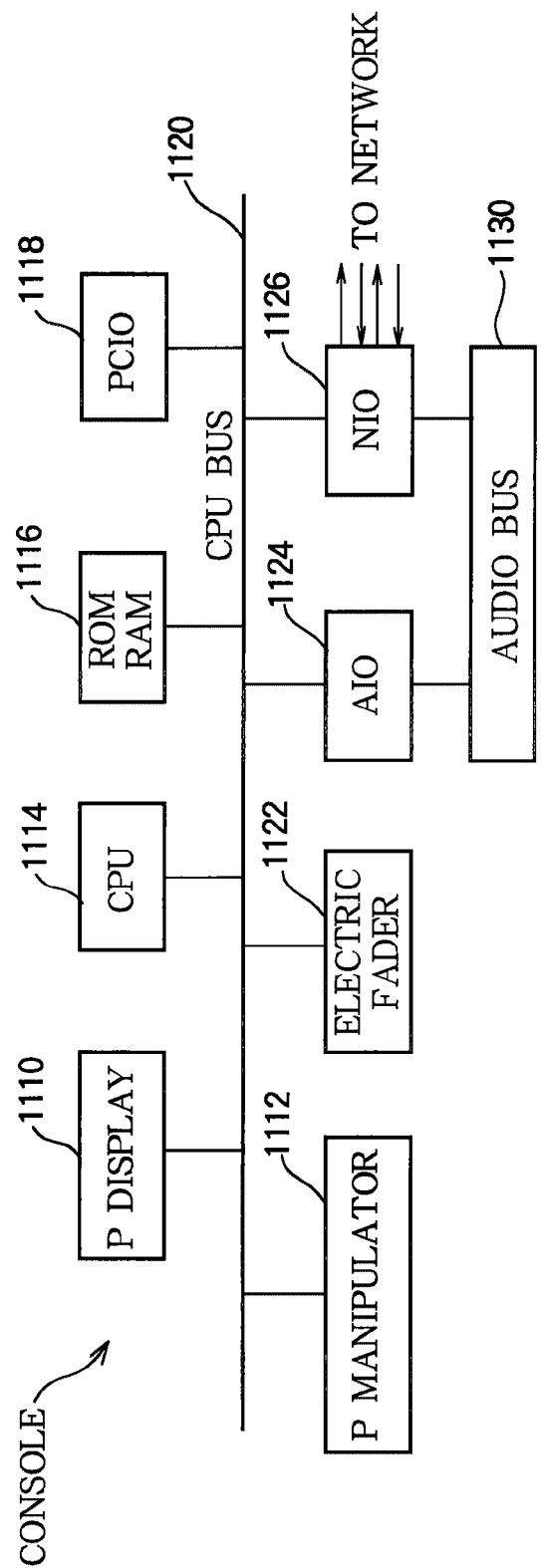

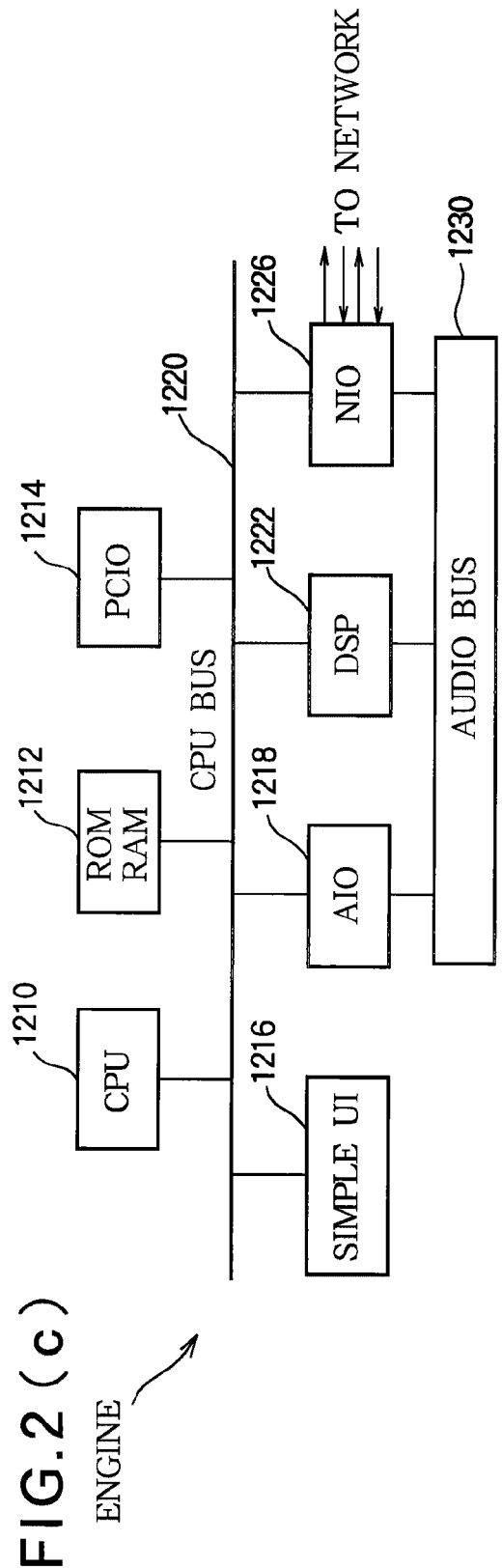
FIG.2(c) ENGINE
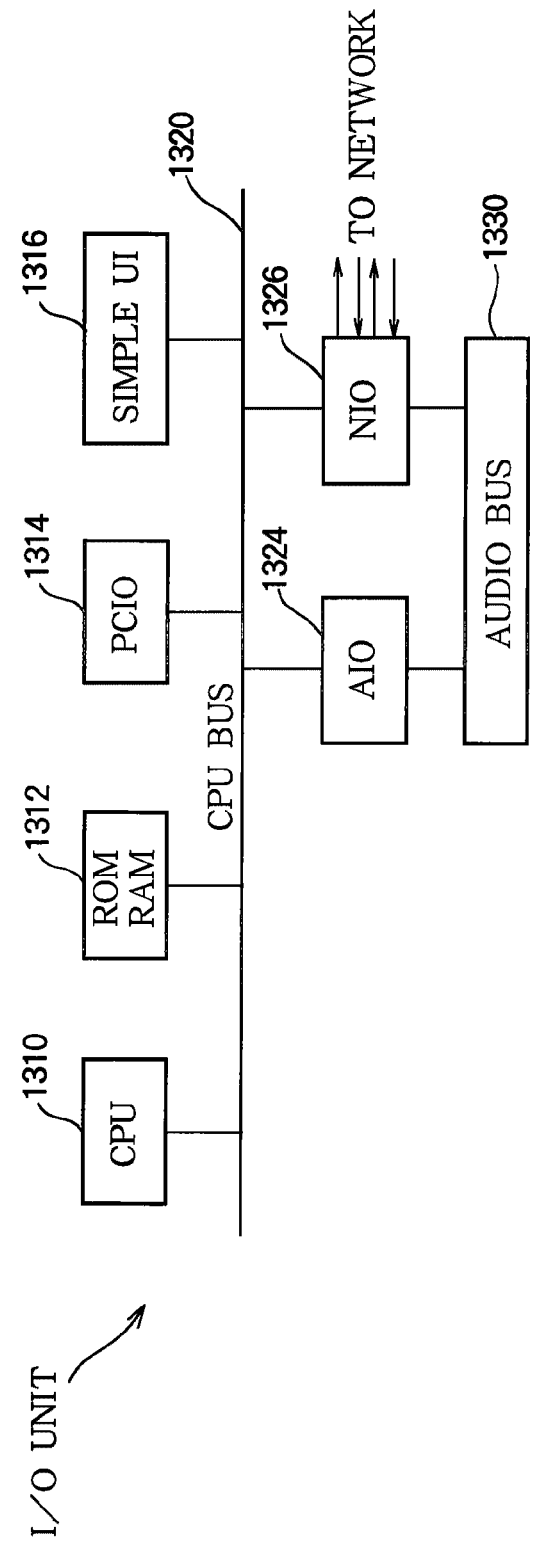
FIG.2(d) I/O UNIT

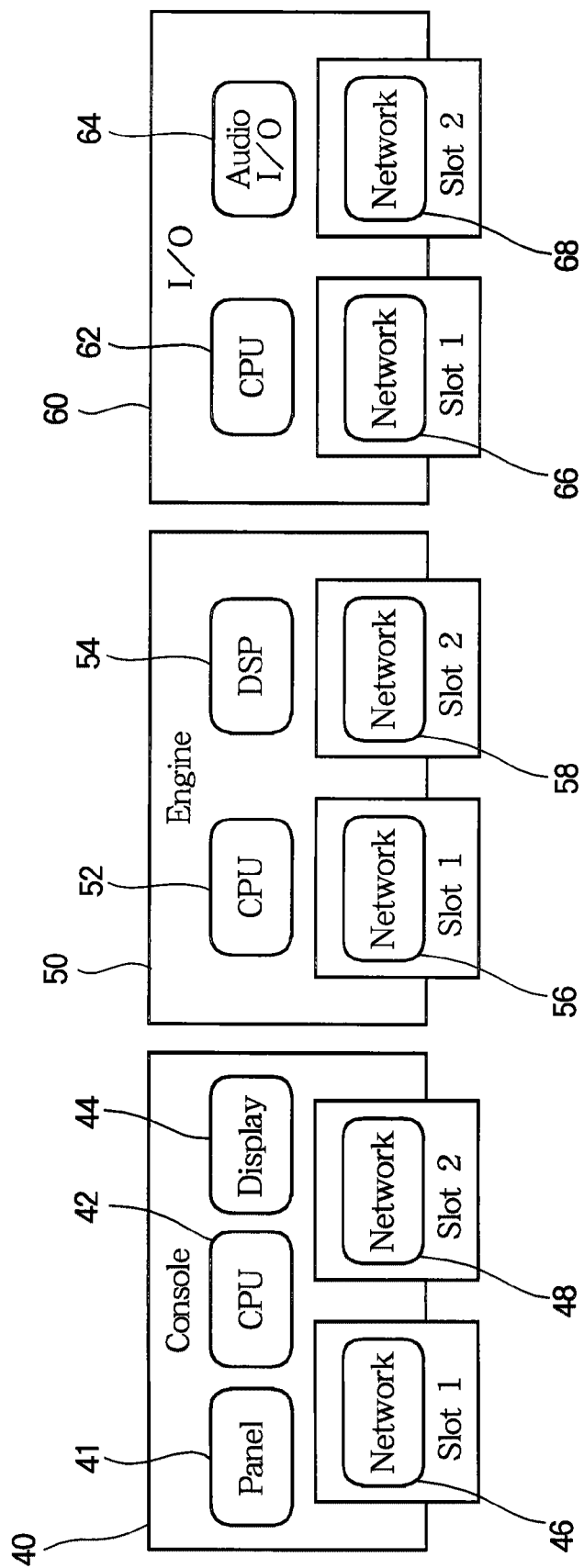
FIG.4 (a) FIRMWARE AND MODULE CONFIGURATION IN DEVICE

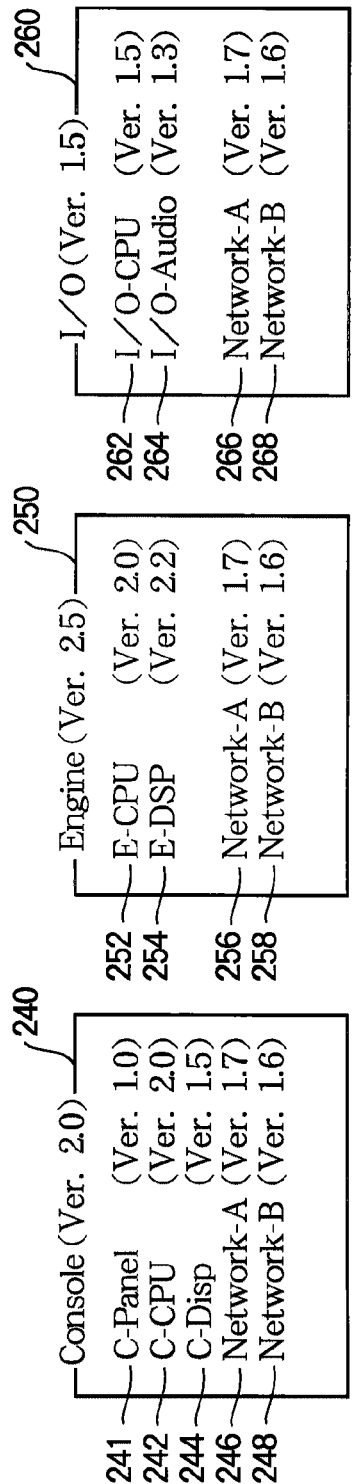

FIRMWARE UPDATE APPARATUS AND PROGRAM

BACKGROUND OF THE INVENTION

1. Technical Field of the Invention

The present invention relates to a firmware update apparatus and program suitable for use in mixing of audio signals in a concert hall, a recording studio, or the like.

2. Description of the Related Art

In a known audio signal processing system used in a concert hall, a recording studio, or the like, devices constituting the system exchange audio signals and control signals through a network. One example of the system is described in Japanese Patent Application Publication No. 2008-17084. The devices constituting the system include a console that is manipulated by the user, an engine which performs mixing or the like on audio signals, and an I/O unit for controlling a microphone, a speaker, or the like. Each device is controlled by a CPU and includes a memory that stores a firmware to enable control by the CPU. The firmware is often updated to correct bugs or add new functions. While each device's manufacturer provides the latest version of its firmware over the Internet or the like, the device's owner decides whether or not to download and update the firmware.

It is necessary to update the versions of firmwares of devices so as not to cause incompatibility (conflicts) between the firmwares. For example, the console and the engine operate normally when both the versions of the firmwares of the console and the engine are "1.00" and also operate normally when both the versions are "2.00". However, the console and the engine may operate abnormally, for example, when the version of the firmware of the console is "1.00" while the version of the firmware of the engine is "2.00". Of course, this is taken into consideration when the manufacturers of the devices provide the latest versions of the firmwares over the Internet or the like and thus no conflict can occur between firmwares, provided that the latest versions of the firmwares are applied to all devices.

However, even when manufacturers provide latest versions of the firmwares of all devices, the user may not desire to or unable to update the firmwares of all devices to the latest versions. The reasons are mostly as follows.

(1) First, the latest version of the firmware may have bugs that do not exist in the past version. As a result, users may not desire to update the version of the firmware when the new version does not provide a function that is commonly used in the past version.

(2) In addition, there is always the risk of bugs even when whether or not bugs are incorporated into the latest version is not clear. Thus, most users may desire to use the old version of the firmware without update if the old version operates reliably, for example, when the performance of a concert is coming up soon.

(3) Further, a long time may be required to update the versions of firmwares of a number of devices. That is, hundreds of devices are used in a large-scale event although the time required to update each device is not too long. In this case, the agent rarely owns all required devices and mostly rents devices from a plurality of rental companies. Compatibility between firmwares of the devices is not guaranteed since the owners (or rental companies) of the devices are different. Mostly, devices are rented immediately before a concert or the like begins to reduce rental costs and thus it is not possible to secure a sufficient time to update the versions of firmwares of the devices.

(4) Moreover, the owners (or rental companies) may not agree with updating the versions of the firmwares of the rented devices.

For these reasons, there has been a demand to restrict updating of firmwares of devices within a range that does not cause conflicts, rather than updating firmwares of all devices constituting the audio signal processing system to the latest versions. However, to accomplish this, it is necessary for the user to perform very complicated tasks to manage firmware versions so as to avoid conflicts.

SUMMARY OF THE INVENTION

The invention has been made in view of the above circumstances and it is an object of the invention to provide a firmware update apparatus and program which can easily and reliably perform partial update of the version of a firmware.

In order to solve the above problems, the invention provides configurations described below. Namely, in one aspect of the invention, there is provided a firmware update apparatus which communicates with a plurality of audio processing devices, each audio processing device being classified as one of a plurality of device types and transmitting an audio signal over a network to other audio processing device or receiving an audio signal over a network from other audio processing device, and which updates a firmware stored in each of the audio processing devices, the firmware being a control program for controlling the audio processing device. The firmware update apparatus comprises: a reference device specification part that specifies one of the plurality of audio processing devices as a reference device based on a manipulation by a user; a version number acquisition part that acquires version numbers of respective firmwares stored in the audio processing devices from the audio processing devices; a matching table storage that stores a matching table defining a combination of compatible version numbers of firmwares from among combinations of version numbers of firmwares; an incompatible device display part that performs display for specifying an audio processing device that stores a firmware that does not satisfy compatibility defined in the matching table with a firmware stored in the reference device; an update target type selection part that specifies a firmware update target device type from among the plurality of device types based on a manipulation by the user; and a firmware update instruction part that transmits an update command instructing update of the firmware to one or more of audio processing devices belonging to the firmware update target device type selected by the update target type selection part.

In an expedient form, each of the plurality of audio processing devices belongs to one of a plurality of device groups and the firmware update apparatus further comprises a device group specification part that specifies one firmware update target device group from among the plurality of device groups based on a manipulation by the user, and the firmware update instruction part transmits the update command to one or more of audio processing devices belonging to the firmware update target device group specified by the device group specification part and also belonging to the firmware update target device type selected by the update target type selection part.

In a preferred form, the firmware update apparatus further comprises a version number selection part that lists, for each of the device types, one or more of version numbers having compatibility with the firmware stored in the reference device based on the matching table, and that selects an update goal version number from the listed version numbers for each of the device types based on a manipulation by the user.

The invention further provides a machine readable storage medium storing a program for use in a firmware update apparatus which communicates with a plurality of audio processing devices, each audio processing device being classified as one of a plurality of device types and transmitting or receiving an audio signal over a network to or from other audio processing device, and which updates a firmware stored in each of the audio processing devices, the firmware being a control program for controlling the audio processing device, the firmware update apparatus including a processor and a matching table storage that stores a matching table defining a combination of compatible version numbers of firmwares from among combinations of version numbers of firmwares. The program is executable by the processor for causing the firmware update apparatus to perform: a reference device specifying process that specifies one of the plurality of audio processing devices as a reference device based on a manipulation by a user; a version number acquisition process that acquires version numbers of firmwares stored in the respective audio processing devices from the audio processing devices; an incompatible device display process that performs display for specifying an audio processing device that stores a firmware that does not satisfy compatibility defined in the matching table with a firmware stored in the reference device; an update target type selection process that specifies a firmware update target device type from among the plurality of device types based on a manipulation by the user; and a firmware update instruction process that transmits an update command instructing update of the firmware to one or more of audio processing devices belonging to the firmware update target device type selected in the update target type selection process.

In another aspect of the invention, there is provided a firmware update apparatus which communicates with a plurality of audio processing devices, each audio processing device belonging to one of a plurality of device groups, and which updates a firmware stored in each of the audio processing devices, the firmware being a control program for controlling the audio processing device. Each of the audio processing devices includes a first network interface for communicating with another audio processing device within a device group to which the audio processing device belongs, each of the audio processing devices transmitting or receiving an audio signal to or from another audio processing device within the device group through the first network interface. At least one audio processing device of each of the device groups includes a second network interface for communicating with an audio processing device belonging to another device group, the at least one audio processing device transmitting or receiving an audio signal to or from an audio processing device belonging to another device group through the second network interface to perform audio signal communication between the plurality of device groups. The firmware update apparatus comprises: a device group specification part that specifies a device group, whose firmware is to be updated, as an update target device group from among the plurality of device groups based on a manipulation by a user; an update target device selection part that selects one or more of audio processing devices belonging to the update target device group as one or more of update target devices based on a manipulation by the user; an inter-group interface update specification part that specifies whether or not to update a firmware associated with the second network interface based on a manipulation by the user; and a firmware update instruction part that transmits an update command instructing update of firmwares of the update target devices, including the firmware associated with the second network interface, to each of the update target devices, provided that information indicating update of the firmware associated with the second network interface has been set by the inter-group interface update specification part, and that transmits an update command instructing update of firmwares of the update target devices, excluding the firmware associated with the second network interface, to each of the update target devices, provided that information indicating update of the firmware associated with the second network interface has not been set by the inter-group interface update specification part.

In a preferred form, the firmware update apparatus further comprises: a reference device specification part that specifies one of a plurality of audio processing devices belonging to the update target device group as a reference device based on a manipulation by the user; a version number acquisition part that acquires version numbers of firmwares stored in the audio processing devices belonging to the update target device group from the audio processing devices belonging to the update target device group; a matching table storage that stores a matching table defining a combination of compatible version numbers of firmwares from among combinations of version numbers of firmwares; and an incompatible device display part that performs display for specifying an audio processing device that stores a firmware that does not satisfy compatibility defined in the matching table with a firmware stored in the reference device from among the audio processing devices belonging to the update target device group.

The invention further provides a machine readable storage medium containing a program for use in a firmware update apparatus which communicates with a plurality of audio processing devices, each audio processing device belonging to one of a plurality of device groups, and which updates a firmware stored in each of the audio processing devices, the firmware being a control program for controlling the audio processing device, each of the audio processing devices including a first network interface for communicating with another audio processing device within a device group to which the audio processing device belongs, each of the audio processing devices transmitting or receiving an audio signal to or from another audio processing device within the device group through the first network interface, at least one audio processing device of each of the device groups including a second network interface for communicating with an audio processing device belonging to another device group, the at least one audio processing device transmitting or receiving an audio signal to or from an audio processing device belonging to another device group through the second network interface to perform audio signal communication between the plurality of device groups, the firmware update apparatus including a processor and a matching table storage that stores a matching table defining a combination of compatible version numbers of firmwares from among combinations of version numbers of firmwares. The program is executable by the processor for causing the firmware update apparatus to perform: a device group specification process that specifies a device group, whose firmware is to be updated, as an update target device group from among the plurality of device groups based on a manipulation by a user; an update target device selection process that selects one or more of audio processing devices belonging to the update target device group as one or more of update target devices based on a manipulation by the user; an inter-group interface update specification process that specifies whether or not to update a firmware associated with the second network interface based on a manipulation by the user; and a firmware update instruction process that transmits an update command instructing update of firmwares of the update target devices, including the firmware associated with the second network interface, to each of the update target devices, provided that information indicating update of the firmware associated with the second network interface has been set in the inter-group interface update specification process, and that transmits an update command instructing update of firmwares of the update target devices, excluding the firmware associated with the second network interface, to each of the update target devices, provided that information indicating update of the firmware associated with the second network interface has not been set in the inter-group interface update specification process.

According to one aspect of the invention, the user can easily identify an audio processing device which does not cause conflict since the incompatible device display part performs display for specifying the audio processing device that stores the firmware that does not satisfy compatibility defined in the matching table with the firmware stored in the reference device.

In addition, in the case where the firmware update apparatus includes the version number selection part, the user can reliably select a firmware of a version which does not cause conflict since the version number selection part lists, for each of the device types, one or more of version numbers having compatibility with the firmware stored in the reference device, and selects an update goal version number from the listed version numbers for each of the device types based on a manipulation by the user.

According to another aspect of the invention, the inter-group interface update specification part can specify whether or not to update a firmware associated with the second network interface used for communication between device groups, thereby maintaining the version of the firmware of the second network interface capable of communicating with another device group, while automatically updating other firmware. By such a construction, it is possible to readily and securely carry out partial version up of firmware in case that different versions of firmware are applied to different device groups.

BRIEF DESCRIPTION OF THE DRAWINGS

FIG. 1 is a block diagram illustrating an overall configuration of an audio signal processing system of an embodiment of the invention.

FIGS. 2(a)-2(d) are block diagrams illustrating detailed configuration of each device and network configuration.

FIGS. 4(a)-4(c) illustrate module configuration of firmware.

DETAILED DESCRIPTION OF THE INVENTION

Figure 3:
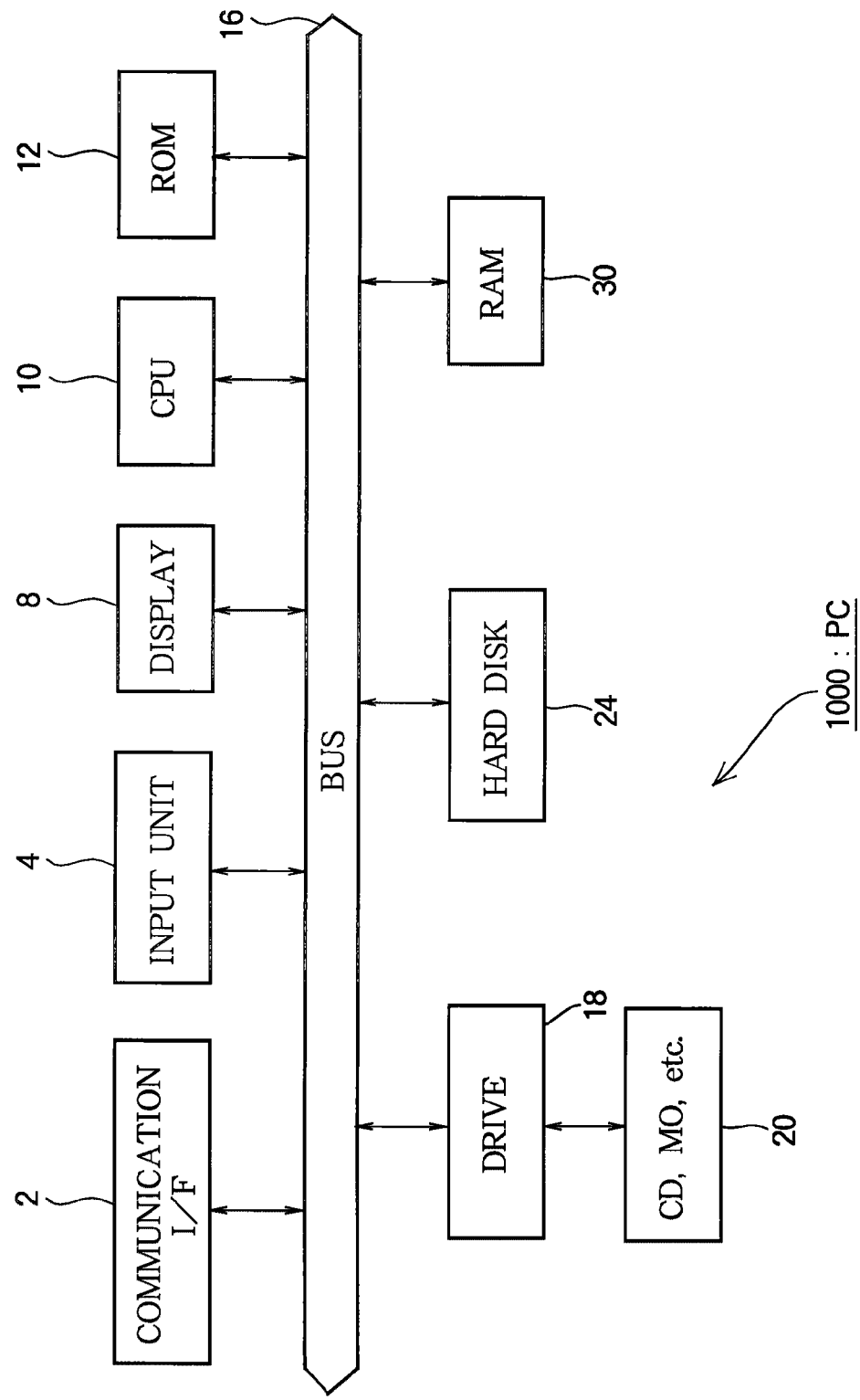
FIG. 3 is a block diagram illustrating a personal computer (PC).

1. Configuration of Embodiment 1.1. Overall Configuration

Next, the overall configuration of an audio signal processing system of an embodiment of the invention is described with reference to FIG. 1. An audio signal processing system of this embodiment is constructed by connecting a plurality of devices over a network. These devices are each classified as one of three device types, namely, "console", "engine", and "I/O unit". The console includes a number of manipulators such as faders and knobs that are manipulated by the user, and generally outputs a control signal based on manipulation states of the manipulators through a network. The engine performs a mixing process or an equalizing process on audio signals received through the network based on the control signal provided from the console and outputs the resulting signal through the network. The I/O unit converts an audio signal input from a microphone or the like into packets and outputs the packets through the network and also converts packets received through the network into an audio signal and provides the resulting signal to a speaker through an amplifier.

In an example of FIG. 1, reference numerals "1502", "1510", and "1606" denote consoles, "1504" and "1604" denote engines, and "1506", "1508", and "1602" denote I/O units. One or two network cards need to be installed in each of the devices 1502 to 1510 and 1602 to 1606 for connection to the network. To accomplish this, each device includes first and second slots Slot1 and Slot2 for installing network cards. Here, a group of devices that are connected through their first slots is referred to as a "device group". In the example illustrated in FIG. 1, the devices 1502 to 1510 are connected through their first slots and thus constitute a device group, which is referred to as a "first device group 1500". Similarly, the devices 1602 to 1606 constitute a second device group 1600.

In addition, the console 1510 and the I/O unit 1602 are installed not only with a network card in the first slot but also with a network card in the second slot, and transmit and receive packets through the second slot. The device's state of transmitting and receiving packets through the second slot in this manner is referred to as "constituting a partial bridge". Each of the first and second device groups 1500 and 1600 processes a defined range of audio signals. For example, it is assumed that each of the first and second device groups 1500 and 1600 processes a specific range of audio signals, for example, audio signals of 100 channels. To allow the two device groups to cooperate with each other, it is necessary to input and output audio signals between the two device groups. However, the device groups need not to provide all audio signals to each other and can cooperate with each other by providing partial audio signals, for example, 10 channels, to each other. Since partial audio signals are input and output between the device groups in this manner, the state of inputting and outputting audio signals is referred to as a "partial bridge".

A plurality of device groups connected through the partial bridge forms a "zone". In the illustrated example, the first and second device groups 1500 and 1600 form a zone 1400. The number of device groups belonging to one zone may be three or more. In this case, devices belonging to each device group may also be installed with network cards in their second slots and may be connected to each other through the second slots. Preferably, each device group is constructed not only so as to perform a group of various functions (for example, back chorus mixing and musical sound mixing) but is also constructed of a group of devices of a single owner (for example, the agent, rental company A, or rental company B).

Reference numeral "1000" denotes a personal computer (PC) which can be connected to any device. The PC 1000 can acquire information of the entire zone (for example, version information of firmwares of all devices involved in the zone 1400) through the device connected to the PC 1000 and can transmit an update command (for example, a command to update the firmware together with binary data of the firmware) to any device belonging to the zone 1400. Acquisition of information of another device group, to which the device connected to the PC 1000 does not belong, and transmission of an update command to the device group are accomplished through the partial bridge. The word "update" used in this embodiment not only means to update a firmware with a new version but also means to return (i.e., downdate) a firmware to an old version.

1.2. Network Configuration

In this embodiment, devices belonging to each device group form a token-ring network by connecting to each other through network cards installed in their first slots. FIG. 2(*a*) illustrates an exemplary configuration of the network 1520 in the first device group 1500. In the token-ring network, one device (the I/O unit 1508 in the illustrated example) serves as a master node and generates a signal that is called a "token". The token is transmitted to each device belonging to the first device group 1500 in a circulative manner in a predetermined order.

Only a device which holds the token has a right to transmit data. That is, when a device desires to transmit data, first, the device catches an empty token and converts the token into a frame and transmits the frame carrying the data. Each device monitors a frame which arrives at the device and acquires content of the frame only when the device's address is specified as a destination in the frame and directly passes a frame, whose destination is not the device, to a next node. This enables devices to communicate data with each other without data collision. Although the network configuration of the first device group 1500 has been described, the network of the second device group 1600 has the same configuration and the devices forming the partial bridge also constitute the token-ring network by connecting to each other through network cards installed in their second slots. Connecting a plurality of networks to each other through a partial bridge in this manner also enables each device group to exchange data with other group.

1.3. Configuration of Each Device

The following is a detailed configuration of each device. First, the configuration of the console is described with reference to FIG. 2(*b*). In FIG. 2(*b*), reference numeral "1110" denotes a panel display unit which includes a large-size dot matrix display and a touch panel, and displays a variety of information to the user. Reference numeral "1112" denotes a panel manipulation unit which includes manipulators such as a knob and a button. Reference numeral "1122" denotes an electric fader which is used for audio volume adjustment of an input/output channel or the like. Reference numeral "1116" denotes a memory which includes a flash ROM and RAM. The flash ROM stores a firmware that is a control program of the console. Reference numeral "1114" denotes a CPU which controls each component of the console through a CPU bus 1120 based on the firmware. Reference numeral "1118" denotes a PC I/O unit which includes an interface for communicating with the PC 1000. Reference numeral "1124" denotes an audio I/O unit for inputting/outputting a small-size voice signal such as an audio signal for communication between workers or a monitor signal.

Reference numeral "1126" denotes a network I/O unit which includes first and second slots which enables data transmission and reception to and from another device through one or two networks through network cards installed in the slots. That is, the network I/O unit 1126 converts a control signal provided from the CPU bus 1120, an audio signal provided from an audio bus 1130, or the like into packets and transmits the packets to a network and also converts the packets provided from the network into a control signal or an audio signal and outputs the control signal or the audio signal through the CPU bus 1120 or the audio bus 1130.

Next, a configuration of the engine is described with reference to FIG. 2(*c*). Reference numeral "1212" denotes a memory which includes a flash ROM and RAM. The flash ROM stores a firmware that is a control program of the engine. Reference numeral "1210" denotes a CPU which controls each component of the engine through a CPU bus 1220 based on the firmware. Reference numeral "1214" denotes a PC I/O unit which includes an interface for communicating with the PC 1000. Reference numeral "1216" denotes a simple UI unit which includes a manipulator that is manipulated by the user and a display for displaying a variety of information to the user. Reference numeral "1218" denotes an audio I/O unit for inputting/outputting a small-size voice signal such as an audio signal for communication between workers. Reference numeral "1222" denotes a DSP which performs a mixing process or an equalizing process on an audio signal received through an audio bus 1230 and outputs the resulting signal through the audio bus 1230. A microprogram for controlling the DSP 1222 is also included in the firmware.

Reference numeral "1226" denotes a network I/O unit which includes first and second slots which enables data transmission and reception to and from another device through one or two networks through network cards installed in the slots. That is, the network I/O unit 1226 converts a control signal provided from the CPU bus 1220, an audio signal provided from the audio bus 1230, or the like into packets and transmits the packets to a network and also converts the packets provided from the network into a control signal or an audio signal and outputs the control signal or the audio signal through the CPU bus 1220 or the audio bus 1230.

Next, a configuration of the I/O unit is described with reference to FIG. 2(*d*). Reference numeral "1312" denotes a memory which includes a flash ROM and RAM. The flash ROM stores a firmware that is a control program of the I/O unit. Reference numeral "1310" denotes a CPU which controls each component of the I/O unit through a CPU bus 1320 based on the firmware. Reference numeral "1314" denotes a PC I/O unit which includes an interface for communicating with the PC 1000. Reference numeral "1316" denotes a simple UI unit which includes a manipulator that is manipulated by the user and a display for displaying a variety of information to the user. Reference numeral "1324" denotes an audio I/O unit which converts an audio signal received through an audio bus 1330 into an analog signal or a digital signal suitable for a corresponding amplifier and outputs the analog or digital signal and also converts an audio signal received from a microphone or the like into a digital signal and provides the digital signal to a network I/O unit 1326 through the audio bus 1330.

Reference numeral "1326" denotes a network I/O unit which includes first and second slots which enable data transmission and reception to and from another device through one or two networks through network cards installed in the slots. That is, the network I/O unit 1326 converts a control signal provided from the CPU bus 1320, an audio signal provided from the audio bus 1330, or the like into packets and transmits the packets to a network, and also converts the packets provided from the network into a control signal or an audio signal and outputs the control signal or the audio signal through the CPU bus 1320 or the audio bus 1330.

1.4. Configuration of PC

Next, a configuration of the PC 1000 is described with reference to FIG. 3.

In FIG. 3, reference numeral "2" denotes a communication interface which is provided to communicate with a file server or the like over the Internet in order to perform firmware download or the like and also to communicate with the PC I/O unit 1118, 1214, or 1314 of any device in order to control the zone 1400. Reference numeral "4" denotes an input device which includes a keyboard for text input, a mouse, and the like. Reference numeral "8" denotes a display unit which displays a variety of information to the user. Reference numeral "10" denotes a CPU which controls other components through a bus 16 based on a program described below. Reference numeral "12" denotes a ROM which stores an initial program loader or the like. Reference numeral "18" denotes a removable disc drive which reads/writes data from/to a removable disc 20 such as a CD-ROM or an MO. Reference numeral "24" denotes a hard disk which stores an operating system, firmwares of the devices involved in the zone 1400, an application program for updating the firmwares, and the like. Reference numeral "30" denotes a RAM which is used as a work memory of the CPU 10.

2. Configuration of Firmware 2.1. Firmware and Module Configurations of Device

As described above, the memories 1116, 1212, and 1312 (flash ROMs) of the devices store respective firmwares for controlling the devices. Each firmware includes a plurality of modules. Contents (or details) of the firmware are described below with reference to FIG. 4(a). First, a firmware 40 in the console includes a panel module 41 for controlling the panel manipulation unit 1112, the electric fader 1122, and the like, a display module 44 for controlling the panel display unit 1110 and the like, network modules 46 and 48 for controlling network cards installed in the first and second slots, and a CPU module 42 for controlling other components.

A firmware 50 in the engine includes a DSP module 54 which is a microprogram of the DSP 1222, network modules 56 and 58 for controlling network cards installed in the first and second slots, and a CPU module 52 for controlling other components. In addition, a firmware 60 in the I/O unit includes an audio I/O module 64 for controlling functions of the audio I/O unit 1324, network modules 66 and 68 for controlling network cards installed in the first and second slots, and a CPU module 62 for controlling other components.

In the example of FIG. 4(a), it is assumed that network cards are installed in both the first and second slots in any device. However, in the case where no network cards are installed in the second slots in the devices, the corresponding modules 48, 58, and 68 are not included in the firmwares of the devices. Any type of network cards selected from two types of network cards with different transmission capacities (for example, 1 Gbps and 2 Gbps), which are hereinafter referred to as "type A" and "type B", may be installed in the devices. Thus, the modes of adoption of network cards may include a mode in which one or two network cards of type A are installed, a mode in which one or two network cards of type B are installed, and a mode in which one network card of type A and one network card of type B are installed.

2.2. Firmware and Module Configurations of PC

Respective firmwares for update are stored in association with corresponding device types in a specific folder of the hard disk 24 of the PC 1000. Each of these firmwares also includes a plurality of modules. Contents of the firmwares are described below with reference to FIG. 4(b). First, a firmware 240 for consoles includes a panel module 241, a CPU module 242, and a display module 244 respectively for updating the modules 41, 42, and 44 of the firmware 40 in the console described above. The firmware 240 also includes a network module 246 for type A and a network module 248 for type B respectively corresponding to the networks of types A and B.

Whether or not both the network modules 246 and 248 are required depends on the configuration of the device (the console in this case). However, the PC 1000 includes all modules that may be required. In the case where a firmware of each device is actually updated, only a required module is selected and transmitted to the device. Since the modules 241 to 248 in the firmware 240 are updated for different reasons, the modules have different version numbers (for example, 1.0, 2.0, and 1.5) as shown in FIG. 4(b). The firmware 240 for consoles is assigned version number 2.0 as shown in FIG. 4(b). That is, this version number is assigned to a set of all illustrated modules 241 to 248 for consoles.

A firmware 250 for engines includes a CPU module 252 and a DSP module 254 respectively for updating the modules 52 and 54 of the firmware 50 in the engine described above. The firmware 250 also includes network modules 256 and 258 for types A and B. The network modules 256 and 258 are identical to the network modules 246 and 248 for consoles described above. Version number 2.5 is assigned to the firmware 250 for engines (i.e., to a set of all modules for engines).

A firmware 260 for I/O units includes a CPU module 262 and an audio I/O module 264 respectively for updating the modules 62 and 64 of the firmware 60 in the I/O unit described above. The firmware 260 also includes network modules 266 and 268 for types A and B. The network modules 266 and 268 are identical to the network modules 246 and 248 for consoles described above. Version number 1.5 is assigned to the firmware 260 for I/O units (i.e., to a set of all modules for I/O units). The version number of each module and the version number of the set of all modules of each device are transmitted from the PC 1000 to each device when the firmware is updated. These version numbers are stored in the flash ROMs 1116, 1212, and 1312 of the devices.

2.3. Matching Table

A matching table 70 shown in FIG. 4(c) is stored in the specific folder of the hard disk 24 of the PC 1000. This table defines combinations of firmware versions of devices, each combination not causing incompatibility (conflicts). For example, referring to a top entry of the table of FIG. 4(c), when the version of the firmware 40 in the console is "2.0", the version of the firmware 50 of each engine which cooperates with the console should be "2.5" or "2.0" and the version of the firmware 60 of each I/O unit which cooperates with the console should be "1.5".

3. Operation of Embodiment 3.1. Procedure of Device Group Setting Window

Figure 5:
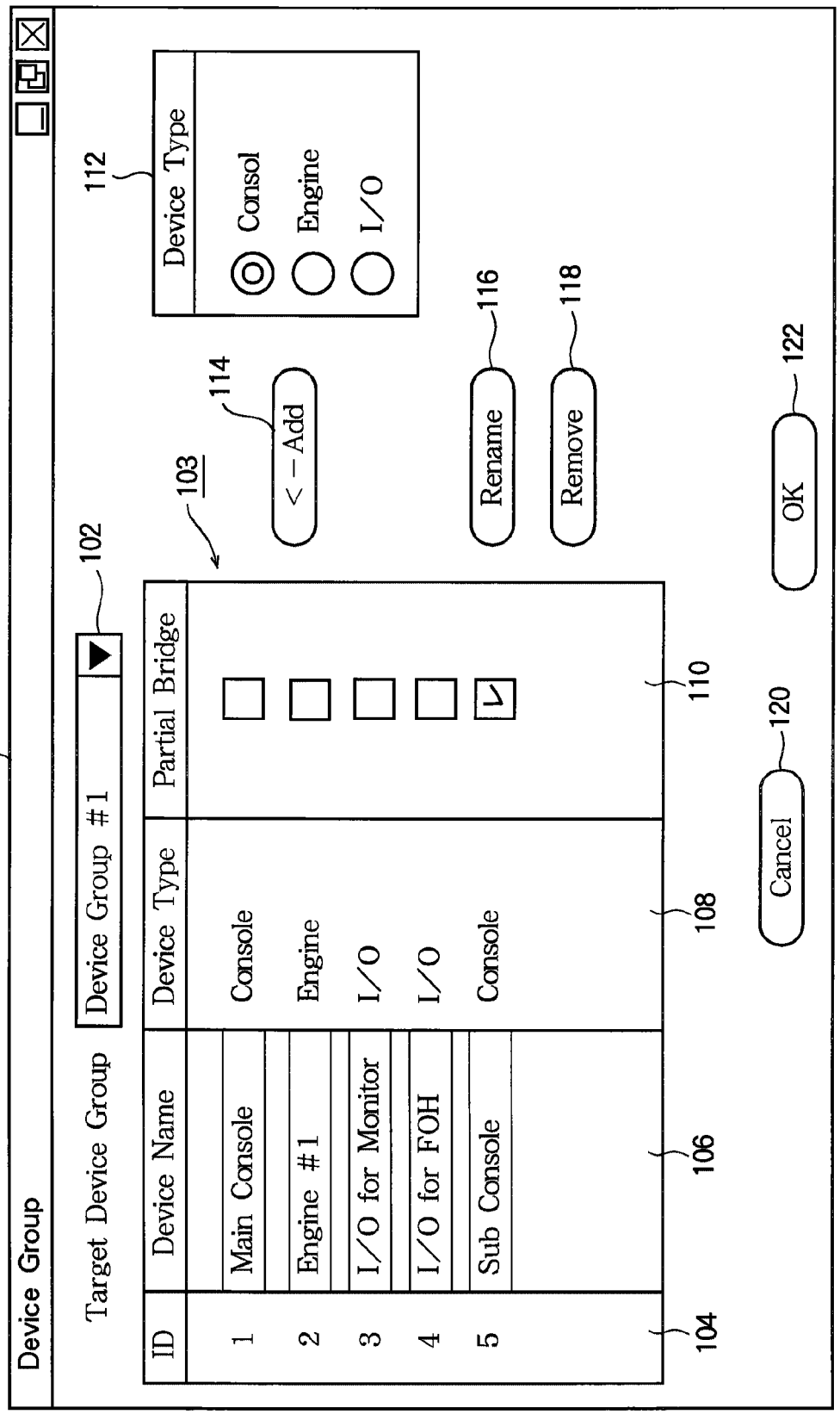
FIG. 5 illustrates a device group setting window displayed on the PC.

The following is a description of the operation of this embodiment. First, data (device group data) describing the configuration of each device group of the zone 1400 is stored in the hard disk 24 of the PC 1000. A user performs a specific manipulation on the PC 1000 to display a device group setting window 100 shown in FIG. 5 on the display 8 in order to edit the device group data. Reference numeral "102" denotes a device group selection list box which is used to select a device group for setting. Reference numeral "103" denotes a device setting section which displays a list of devices belonging to the selected device group. Reference numeral "104" shown in the device setting section 103 denotes an identification (ID) display section which displays unique IDs that are automatically assigned to the devices belonging to the selected group. Reference numeral "106" denotes a device name display portion which displays respective names of the devices.

Reference numeral "108" denotes a device type display portion which displays respective device types of the devices. Reference numeral "110" denotes a partial bridge setting portion which includes check boxes corresponding respectively to the devices, each check box being used to set whether or not the corresponding device constitutes a partial bridge. In the illustrated example, a console of "ID=5" constitutes the partial bridge. Reference numeral "112" denotes a device type selection portion which includes radio buttons for selecting the type of a new device to be added to the current device group. Reference numeral "114" denotes an Add button which allows a device of the type selected through the device type selection portion 112 to be added to the current device group when clicked with a mouse.

Reference numeral "116" denotes a rename button provided to change the name of a device. That is, when the user clicks the rename button 116 with the mouse after selecting a device in the device setting section 103, a corresponding device entry in the device name display portion 106 is changed to a text box such that the user can change the name of the device in the text box. Reference numeral "118" denotes a remove button provided to remove a device. That is, when the user clicks the remove button 118 with the mouse after selecting a device in the device setting section 103, the device is removed from the currently selected device group. Reference numeral "122" denotes an OK button. When the OK button 122 is clicked with the mouse, the device group data in the hard disk 24 is updated based on the setting contents (or setting data) of the device group setting window 100 and the window 100 is then closed. Reference numeral "120" denotes a cancel button. When the cancel button 120 is clicked with the mouse, the setting contents of the device group setting window 100 is discarded and the device group setting window 100 is closed without updating the device group data.

The contents of the device setting section 103 correspond to the configuration of the first device group 1500 shown in FIG. 1. That is, devices of IDs 1 to 5 correspond to the devices 1502 to 1510. Since the device group setting window 100 is provided to edit the device group data stored in the hard disk 24 of the PC 1000, it is possible to edit the device group data so as to be different from the configuration of the actual device group using the device group setting window 100 and is also possible to edit the device group data even when the PC 1000 is not connected to any device.

Thereafter, when the user performs a predetermined manipulation on the PC 1000 after connecting the PC 1000 to a device, device group data in the PC 1000 and actual device group data are checked and, when the two device group data are different, an error message is displayed on the PC 1000, prompting the user to correct one of the two device group data. On the other hand, when the device group data in the PC 1000 and the actual device group data are identical, version numbers of firmwares of all devices in the zone 1400 are acquired through the connected device and the acquired version numbers are then incorporated into the device group data in the PC 1000.

3.2. Display of Firmware Update Window

Figure 6:
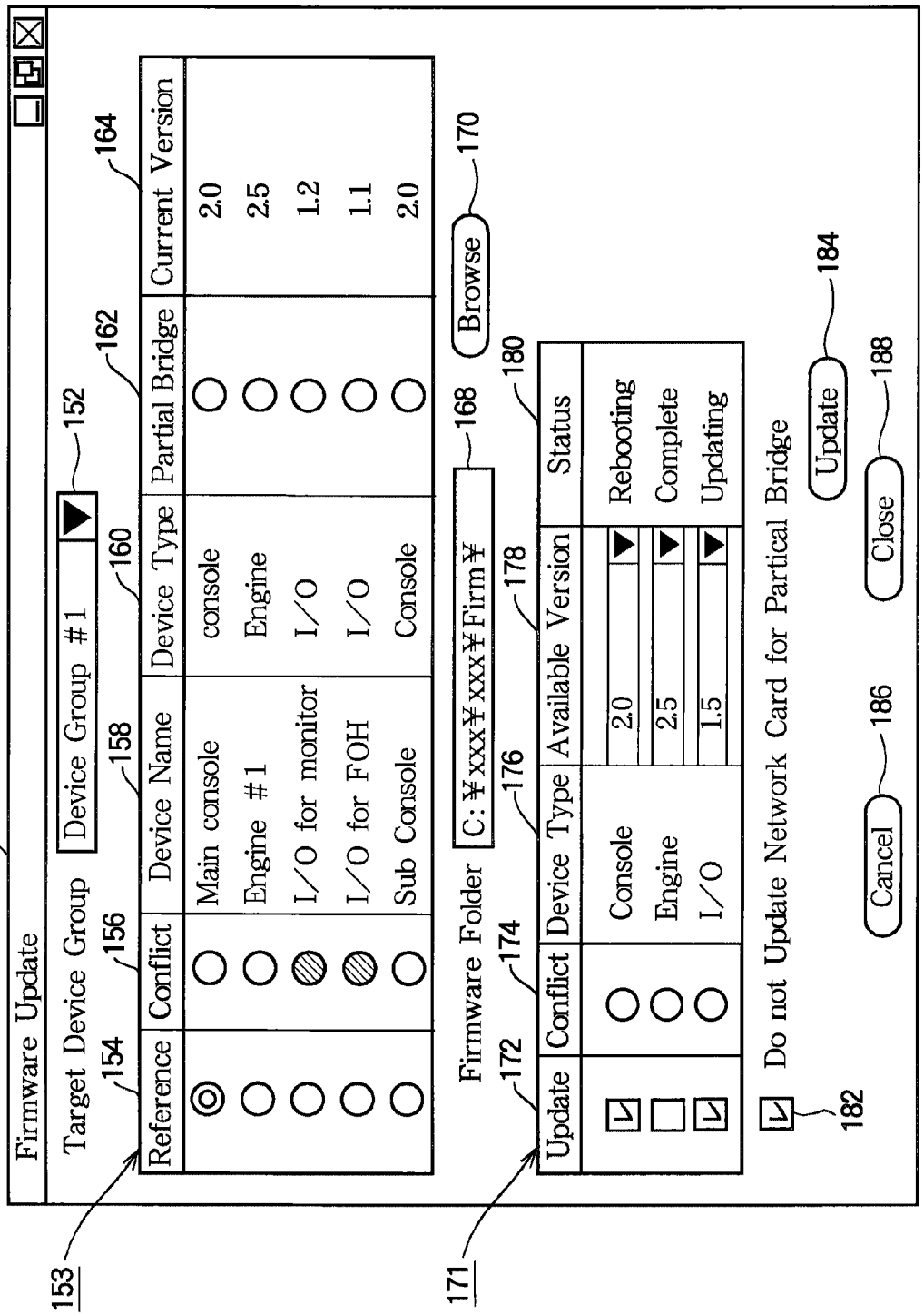
FIG. 6 illustrates a window displayed on the PC.

When the user performs a predetermined manipulation on the PC 1000 after the version numbers of the devices in the zone 1400 are incorporated into the device group data in the PC 1000, a firmware update window 150 shown in FIG. 6 is displayed on the PC 1000. In FIG. 6, reference numeral "152" denotes a device group selection list box which is used to select a device group for firmware update based on a manipulation by the user. In this embodiment, the device group selection list box 152 allows the user to update the version of only a device group which requires update, for example, when there is no time to perform update the versions of all devices. In addition, when firmware version update of particular devices is prohibited due to their owner's (or their rental company's) interest or the like, a device group may be constructed of only such particular devices, thereby preventing conflicts with other devices (whose versions have been updated).

Reference numeral "153" denotes a device setting section which displays a list of devices belonging to the selected device group. The contents of the device setting section 153 of FIG. 6 correspond to the contents of the device setting section 103 of FIG. 4 and the configuration of the first device group 1500 shown in FIG. 1. Reference numeral "154" shown in the device setting section 153 denotes a reference setting portion which is used to selectively set a device in the device group as a "reference device" based on a manipulation by the user. This reference device is used as a reference for determining whether or not a firmware version conflict is present. Reference numeral "156" denotes a conflict display portion which displays whether or not each device other than there is a conflict with the reference device. Reference numeral "158" denotes a device name display portion which displays the name of each device. Reference numeral "160" denotes a device type display portion which displays the type of each device. Reference numeral "162" denotes a partial bridge display portion which is lit when a corresponding device constitutes a partial bridge. Reference numeral "164" denotes a current version display portion which displays the version of a firmware currently stored in each device.

Here, detailed display contents of the device setting section 153 are described as follows. In the illustrated example, the reference device is a device at the first row in the device setting section 153. The name of this device is a "main console" and the device type thereof is a "console". The current version display portion 164 indicates that the current version of the firmware of the reference device is 2.0. Referring to the matching table 70 shown in FIG. 4(c), when the version of the firmware of the console is "2.0", the version of a firmware of an engine which cooperates with the console should be "2.5" or "2.0" and the version of a firmware of an I/O unit which cooperates with the console should be "1.5".

However, the versions of I/O units at the third and fourth rows of the device setting section 153 shown in FIG. 6 do not comply with the contents of the matching table 70 since the versions of the I/O units are "1.2" and "1.1", respectively. That is, the firmwares of the I/O units conflict with the firmware of the reference device. Accordingly, parts of the conflict display portion 156 corresponding to the I/O units are lit in the device setting section 153. Reference numeral "168" denotes a firmware folder setting portion which includes a text box for specifying a folder in the hard disk 24 which stores firmwares (for example, the firmwares 240, 250, and 260 in FIG. 4(b)). Reference numeral "170" denotes a browse button. When the browse button 170 is clicked with the mouse, a browse window is opened to allow the user to input a folder name, which is to be written to the firmware folder setting portion 168, through a browse manipulation. The versions of the firmwares 240, 250, and 260 are the latest. However, when firmwares of old versions are stored in the same folder, it is also possible to select firmwares of old versions as update goals.

Reference numeral "171" denotes an update setting section which includes a plurality of rows corresponding respectively to device types. Reference numeral "176" shown in the update setting section 171 denotes a device type name display portion which displays device type names "console", "engine", and "I/O unit" corresponding respectively to the rows. Reference numeral "172" denotes an update goal device selection portion which includes respective check boxes of the device types, each of which is used to select a device type for firmware update based on a checking or ticking manipulation by the user. Reference numeral "174" denotes a conflict display portion which indicates a device type, which is conflicting, through lighting. It is assumed that a device type is conflicting when at least one of devices belonging to the device type is conflicting.

Reference numeral "178" denotes a version selection list box which is used to select an update goal version number for each device type from one or more version numbers compatible with the reference device based on a manipulation by the user. Options listed in the list boxes comply with the contents described in the matching table 70. That is, when the version of the firmware of the console as a reference device is 2.0, the versions of firmwares of other consoles should also be 2.0 and therefore only the version number 2.0 is listed to be selectable for consoles. In addition, since either firmware version 2.5 or 2.0 is suitable for engines, the two version numbers 2.5 and 2.0 are set as options in the list box for engines. Further, since the version of firmwares of I/O units should be 1.5, only the version 1.5 is listed to be selectable in the list box for I/O units.

In this embodiment, the user can easily specify the goal update version of devices of a device group through simple or a small number of manipulations even when the number of the devices of the device group is great since the user can specify a goal firmware update version for each device type as described above. A version is specified for each device type as described above since the versions of firmwares of devices of the same type belonging to the same device group generally have no reason to be different.

In addition, according to this embodiment, the user can reliably select a version which is compatible (i.e., does not conflict) with the reference device since the user can select a firmware version in the version selection list box 178.

Reference numeral "180" denotes a status display portion which displays the progress status of update. In FIG. 6, "Rebooting" indicates that each device is being rebooted after firmware update is completed. "Complete" indicates that rebooting is completed. "Updating" indicates that a firmware is being written to the flash ROM. Reference numeral "182" denotes a partial bridge exclusion check box which is used to set, based on a manipulation by the user, whether or not to exclude the firmware for the network card installed in the second slot for the partial bridge from to-be-updated (or update target) firmwares. That is, when this check box is checked, the network card is excluded from update targets.

Reference numeral "184" denotes an update start button which is used to start transmitting an update command, which is a command to update the firmware together with binary data of the firmware) from the PC 1000 to a to-be-updated device according to the settings of the check box 182 and the update setting section 171 when clicked with the mouse. The display contents of the status display portion 180 are appropriately updated as described above according to progress of update. Reference numeral "186" denotes a cancel button. When the cancel button 186 is clicked with the mouse, the firmware update window 150 is closed after discarding the setting contents of the window 150. Reference numeral "188" denotes a close button. When the close button 188 is clicked, the window 150 is closed after the device group data is updated based on the setting contents of the window 150. Once the update start button 184 is clicked, the window 150 is closed after the device group data is updated based on the setting contents of the window 150. Once the update start button 184 is clicked, update is continued even when the window 150 is closed since update is performed through a separate process.

Here, the purpose of providing the partial bridge exclusion check box 182 described above is described below, referring back to FIG. 1. In FIG. 1, it is assumed that the devices 1502 to 1510 belonging to the first device group 1500 are ones that the company of the agent owns, and the devices 1602 to 1606 belonging to the second device group 1600 are ones that the agent has rented from a rental company. As described above, the rented devices often encounter a situation where it is not possible to secure a sufficient time to update firmwares or where update of the firmwares is prohibited. In this case, first, the version of the firmware of the (rented) network card installed in the second slot of the I/O unit 1602 is checked and the version of the firmware of the network card (owned by the agent) installed in the second slot of the console 1510 may be updated (or downdated) to match the version of the firmware of the rented network card through a manual manipulation (i.e., without using the application program illustrated in FIG. 6).

Accordingly, no problem occurs in communication between the console 1510 and the I/O unit 1602 since the version numbers of the network cards of the second slots which constitute the partial bridge match. Thereafter, the application program illustrated in FIG. 6 may be activated and firmwares of portions, excluding the network cards of the second slots which constitute the partial bridge, may be updated after the check box 182. Accordingly, it is possible to perform communication between the first and second device groups 1500 and 1600 without performing firmware update on the second device group 1600.

3.3. Reference Change Event Procedure (FIG. 7)

The following is a detailed description of a procedure performed when the reference setting portion 154 is manipulated to change the reference device on the window 150 illustrated in FIG. 6. When this manipulation is detected, a reference change event procedure routine shown in FIG. 7 is activated.

Figure 7:
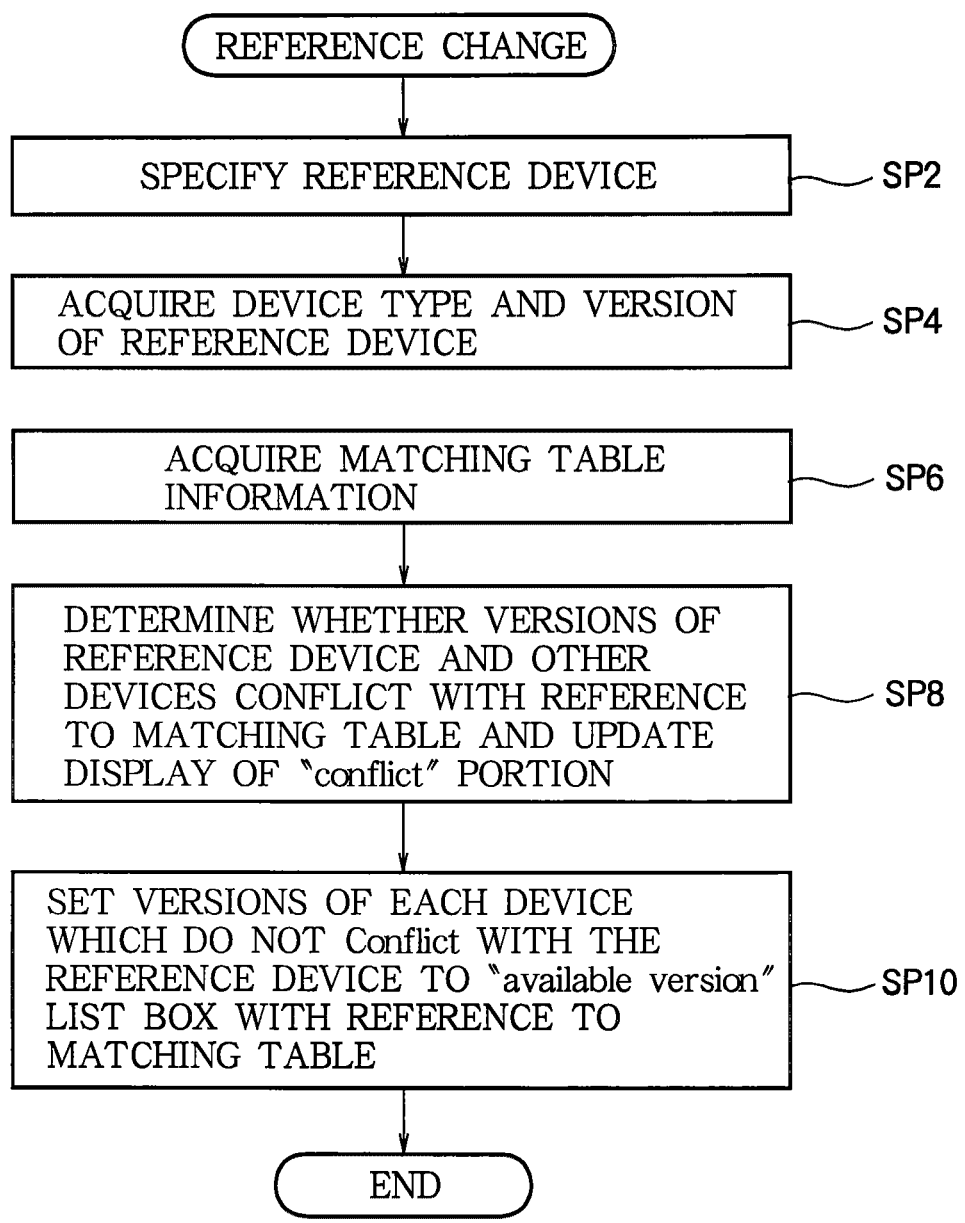
FIG. 7 is a flow chart of a routine of reference change event procedure routine.

As shown in FIG. 7, when the procedure proceeds to step SP2, a device (i.e., a reference device) checked in the reference setting portion 154 is specified. Then, the procedure proceeds to step SP4 to acquire the device type of the reference device and the version of the firmware thereof. Then, the procedure proceeds to step SP6 to acquire contents of a portion in the matching table 70 corresponding to the acquired version from the matching table 70 (see FIG. 4(c)).

Then, the procedure proceeds to step SP8 to acquire version numbers of all devices other than the reference device. In addition, in step SP8, whether or not the version of the reference device conflicts with the version of each of the other devices is determined and display contents corresponding to each device in the conflict display portion 174 are updated based on the determination. Then, the procedure proceeds to step SP10 in which a list of versions of each device other than the reference device, which do not conflict with the version of the reference device, are set as options in the version selection list box 178. The procedure of this routine is then terminated.

3.4. Update Start Event Procedure (FIG. 8)

The following is a detailed description of a procedure performed when the update start button 184 is clicked with the mouse on the window 150 illustrated in FIG. 6. When this manipulation is detected, an update start event procedure routine illustrated in FIG. 8 is activated.

Figure 8:
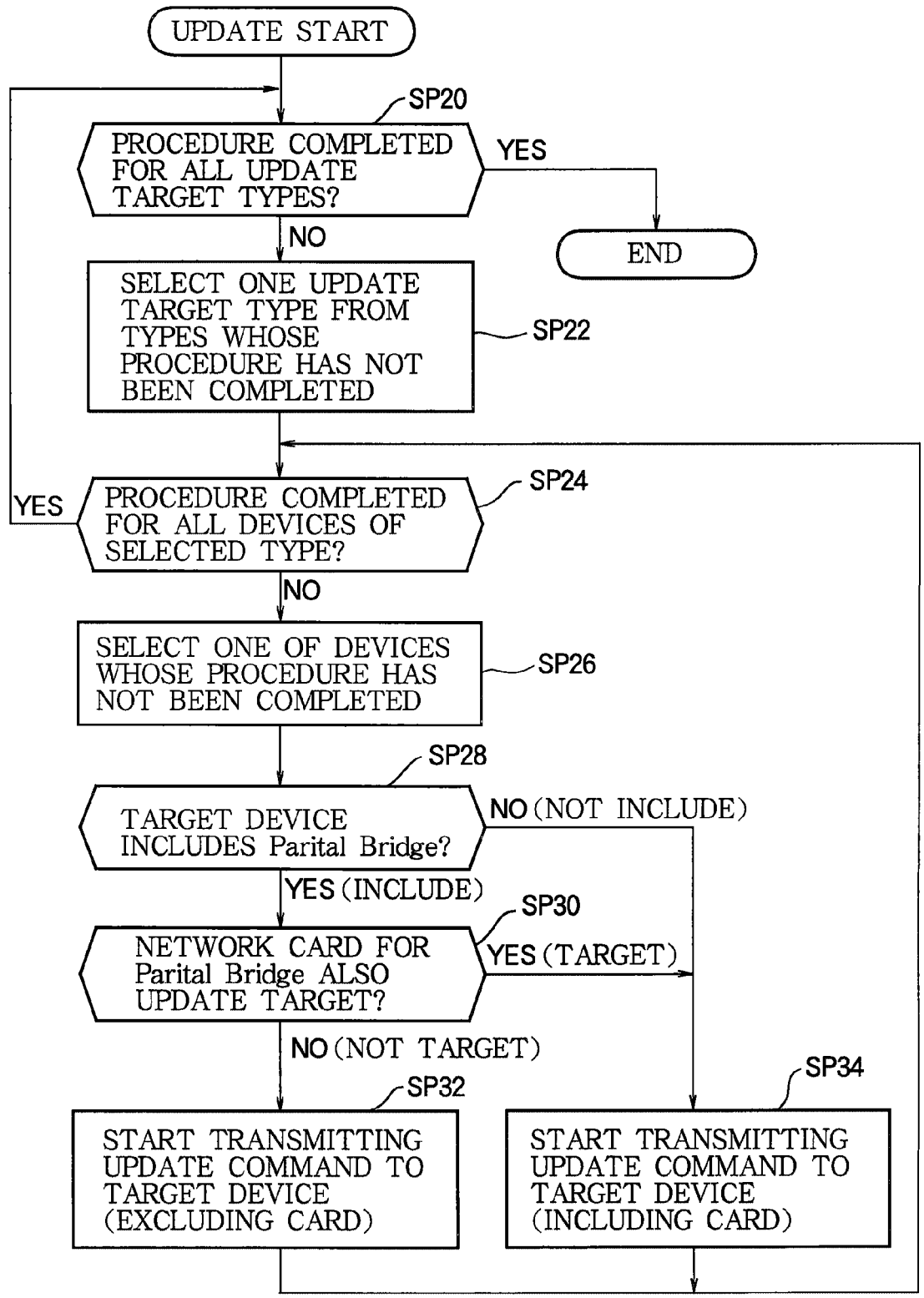
FIG. 8 is a flow chart of a routine of update start event procedure routine.

As shown in FIG. 8, when the procedure proceeds to step SP20, whether or not an update command transmission start procedure (including steps SP32 and SP34) has been completed for all to-be-updated device types is determined. Here, when this determination is NO, the procedure proceeds to step SP22 to select one of device types, for which the update command transmission start procedure has not been completed. Then, the procedure proceeds to step SP24 to determine whether or not the update command transmission start procedure has been completed for all devices belonging to the selected device type. When this determination is No, the procedure proceeds to step SP26 to select one of devices belonging to the selected device type. Here, this selected device is referred to as a "target device".

Then, the procedure proceeds to step SP28 to determine whether or not a network card for a partial bridge has been installed in a second slot of the target device. When this determination is NO (i.e., when the determination is that the network card for the partial bridge has not been installed), the procedure proceeds to step SP34 to start transmitting an update command so that all modules stored in the target device are updated to modules in a version previously specified in the version selection list box 178. That is, a new process for transmitting an update command starts and transmission of the update command is performed in the process. On the other hand, in the case where the network card for the partial bridge has been installed in the second slot of the target device, the determination of SP28 is YES and the procedure proceeds to step SP30. In step SP30, whether or not the network card for the partial bridge installed in the second slot is also a firmware update target is determined based on whether or not the partial bridge exclusion check box 182 has been checked. When the determination of step SP30 is yes, the procedure proceeds to step SP34 to start transmitting an update command so that all modules stored in the target device are updated to the modules in the version specified in the version selection list box 178 as described above.

On the other hand, in the case where the partial bridge exclusion check box 182 has been checked, the determination of step SP30 is NO, i.e., it is determined that the network card for the partial bridge installed in the second slot is not an update target, and the procedure proceeds to step SP32. Here, transmission of an update command to the target device starts so that all modules stored in the target device, other than the network card of the second slot for the partial bridge, are updated to the modules in the version previously specified in the version selection list box 178. When the process of step SP32 or SP34 is terminated, the procedure returns to step SP24 to determine whether or not the update command transmission start procedure (SP32, SP34) has been completed for all devices belonging to the device type selected in step SP22. When this determination is NO, the processes of steps SP26 to SP34 are repeated and transmission of an update command to a new target device starts through the processes of steps SP32 and SP34 each time the processes are repeated.

On the other hand, when the update command transmission start procedure has been completed for all devices belonging to the selected device type, the determination of step SP24 is YES and the procedure returns to step SP20. Here, when the update command transmission start procedure has not been completed for all to-be-updated (update target) device types, the determination of step SP20 is NO and the processes of steps SP22 to SP34 are repeated. When the update command transmission start procedure has been completed for all devices belonging to the update target device group and also belonging to the update target device type, the determination of step SP20 is YES and thus the procedure of this routine is terminated.

4. Modifications

The invention is not limited to the above embodiments and may provide various modifications as follows.

(1) While the application program running on the PC 1000 performs a process such as updating of firmware in the above embodiment, the application program may also be stored and distributed on a machine readable storage medium such as a CD-ROM or a memory card, or may also be distributed over a transmission path.

(2) The above embodiment has two aspects, namely, the first aspect that a firmware version is specified for each device type in the version selection list box 178 and the second aspect that update of a network card of a second slot for a partial bridge is prohibited through the partial bridge exclusion check box 182. However, only one of the two aspects may be applied. When only the first aspect is applied, the check box 182 merely needs to be removed from the window 150. When only the second aspect is applied, the update setting section 171 may be set for each device rather than for each device type, similar to the device setting section 153, and an update goal version number may be specified for each device.

As described above, the first aspect of the invention provides a firmware update apparatus (1000) which communicates with a plurality of audio processing devices (1502-1510), each being classified as one of a plurality of device types and transmitting or receiving an audio signal over a network to or from each other, and which updates a firmware stored in each of the audio processing devices (1502-1510), the firmware being a control program for controlling the audio processing device, the firmware update apparatus (1000) including a reference device specification part (154) that specifies one of the plurality of audio processing devices as a reference device based on a manipulation by a user, a version number acquisition part (SP8) that acquires version numbers of firmwares stored in the respective audio processing devices from the audio processing devices, a matching table storage (24) that stores a matching table (70) defining a combination of compatible version numbers of firmwares from among combinations of version numbers of firmwares, an incompatible device display part (156) that performs display for specifying an audio processing device that stores a firmware that does not satisfy compatibility defined in the matching table (70) with a firmware stored in the reference device, an update target type selection part (172) that specifies a firmware update target device type from among the plurality of device types based on a manipulation by the user, and a firmware update instruction part (SP32, SP34) that transmits an update command instructing update of the firmware to one or more of audio processing devices belonging to a device type selected by the update target type selection part (172).

In an expedient form, each of the plurality of audio processing devices belongs to one of a plurality of device groups and the firmware update apparatus further includes a device group specification part (152) that specifies one firmware update target device group from among the plurality of device groups based on a manipulation by the user. The firmware update instruction part (SP32, SP34) transmits the update command to one or more of audio processing devices belonging to the device group specified by the device group specification part (152) and also belonging to the device type selected by the update target type selection part (172).

In a preferred from, the firmware update apparatus further includes a version number selection part (178) that lists, for each of the device types, one or more of version numbers having compatibility with the firmware stored in the reference device based on the matching table (70) and selects an update goal version number from the listed version numbers for each of the device types based on a manipulation by the user.

The first aspect of the invention further provides a program for application to a firmware update apparatus (1000) which communicates with a plurality of audio processing devices (1502-1510), each audio processing device being classified as one of a plurality of device types and transmitting or receiving an audio signal over a network to or from other audio processing device, and which updates a firmware stored in each of the audio processing devices (1502-1510), the firmware being a control program for controlling the audio processing device, the firmware update apparatus (1000) including a processor (10) and a matching table storage (24) that stores a matching table (70) defining a combination of compatible version numbers of firmwares from among combinations of version numbers of firmwares, the program causing the processor (10) to perform a reference device specifying process (154) that specifies one of the plurality of audio processing devices as a reference device based on a manipulation by a user, a version number acquisition process (SP8) that acquires version numbers of firmwares stored in the audio processing devices from the audio processing devices, an incompatible device display process (156) that performs display for specifying an audio processing device that stores a firmware that does not satisfy compatibility defined in the matching table (70) with a firmware stored in the reference device, an update target type selection process (172) that specifies a firmware update target device type from among the plurality of device types based on a manipulation by the user, and a firmware update instruction process (SP32, SP34) that transmits an update command instructing update of the firmware to one or more of audio processing devices belonging to a device type selected in the update target type selection process (172).

In the second aspect of the invention, there is provided a firmware update apparatus (1000) which communicates with a plurality of audio processing devices (1502-1510), each audio processing device belonging to one of a plurality of device groups, and which updates a firmware stored in each of the audio processing devices (1502-1510), the firmware being a control program for controlling the audio processing device, each of the audio processing devices including a first network interface (a network card in the first slot) for communicating with another audio processing device within a device group to which the audio processing device belongs, each of the audio processing devices transmitting or receiving an audio signal to or from another audio processing device within the device group through the first network interface, at least one audio processing device of each of the device groups including a second network interface (a network card in the second slot) for communicating with an audio processing device belonging to another device group, the at least one audio processing device transmitting or receiving an audio signal to or from an audio processing device belonging to another device group through the second network interface to perform audio signal communication between the plurality of device groups. The firmware update apparatus (1000) comprises: a device group specification part (152) that specifies a device group, whose firmware is to be updated, as an update target device group from among the plurality of device groups based on a manipulation by a user; an update target device selection part (172) that selects one or more of audio processing devices belonging to the update target device group as one or more of update target devices based on a manipulation by the user; an inter-group interface update specification part (182) that specifies whether or not to update a firmware associated with the second network interface (the network card in the second slot) based on a manipulation by the user; and a firmware update instruction part (SP32, SP34) that transmits an update command instructing update of firmwares of the update target devices, including the firmware associated with the second network interface, to each of the update target devices, provided that information indicating update of the firmware associated with the second network interface has been set by the inter-group interface update specification part (182), and that transmits an update command instructing update of firmwares of the update target devices, excluding the firmware associated with the second network interface, to each of the update target devices, provided that information indicating update of the firmware associated with the second network interface has not been set by the inter-group interface update specification part (182).

In an expedient form, the firmware update apparatus further comprises: a reference device specification part (154) that specifies one of a plurality of audio processing devices belonging to the update target device group as a reference device based on a manipulation by the user; a version number acquisition part (SP8) that acquires version numbers of firmwares stored in the audio processing devices belonging to the update target device group from the audio processing devices belonging to the update target device group; a matching table storage (24) that stores a matching table (70) defining a combination of compatible version numbers of firmwares from among combinations of version numbers of firmwares; and an incompatible device display part (156) that performs display for specifying an audio processing device that stores a firmware that does not satisfy compatibility defined in the matching table (70) with a firmware stored in the reference device from among the audio processing devices belonging to the update target device group.

The invention further provides a program for use in a firmware update apparatus (1000) which communicates with a plurality of audio processing devices (1502-1510), each audio processing device belonging to one of a plurality of device groups, and which updates a firmware stored in each of the audio processing devices (1502-1510), the firmware being a control program for controlling the audio processing device, each of the audio processing devices including a first network interface (a network card in a first slot) for communicating with another audio processing device within a device group to which the audio processing device belongs, each of the audio processing devices transmitting or receiving an audio signal to or from another audio processing device within the device group through the first network interface, at least one audio processing device of each of the device groups including a second network interface (a network card in a second slot) for communicating with an audio processing device belonging to another device group, the at least one audio processing device transmitting or receiving an audio signal to or from an audio processing device belonging to another device group through the second network interface to perform audio signal communication between the plurality of device groups, the firmware update apparatus (1000) including a processor (10) and a matching table storage (24) that stores a matching table (70) defining a combination of compatible version numbers of firmwares from among combinations of version numbers of firmwares. The program is executable by the processor for causing the firmware update apparatus to perform: a device group specification process (152) that specifies a device group, whose firmware is to be updated, as an update target device group from among the plurality of device groups based on a manipulation by a user; an update target device selection process (172) that selects one or more of audio processing devices belonging to the update target device group as one or more of update target devices based on a manipulation by the user; an inter-group interface update specification process (182) that specifies whether or not to update a firmware associated with the second network interface (the network card in the second slot) based on a manipulation by the user; and a firmware update instruction process (SP32, SP34) that transmits an update command instructing update of firmwares of the update target devices, including the firmware associated with the second network interface, to each of the update target devices, provided that information indicating update of the firmware associated with the second network interface has been set in the inter-group interface update specification process, and that transmits an update command instructing update of firmwares of the update target devices, excluding the firmware associated with the second network interface, to each of the update target devices, provided that information indicating update of the firmware associated with the second network interface has not been set in the inter-group interface update specification process.

The invention claimed is:

1. A firmware update apparatus which communicates with a plurality of audio processing devices, each audio processing device being classified as one of a plurality of device types and transmitting an audio signal over a network to another audio processing device or receiving an audio signal over a network from another audio processing device, and which updates a firmware stored in each of the plurality of audio processing devices, the firmware being a control program for controlling the audio processing device, the firmware update apparatus comprising:
a reference device specification part that specifies one of the plurality of audio processing devices as a reference device based on a manipulation by a user;
a version number acquisition part that acquires version numbers of firmwares stored in the audio processing devices from the audio processing devices;
a matching table storage that stores a matching table defining a combination of compatible version numbers of firmwares from among combinations of version numbers of firmwares;
an incompatible device display part that performs display for specifying an audio processing device that stores a firmware that does not satisfy compatibility defined in the matching table with a firmware stored in the reference device;
an update target type selection part that specifies a firmware update target device type from among the plurality of device types based on a manipulation by the user; and
a firmware update instruction part that transmits an update command instructing update of the firmware to one or more audio processing devices belonging to the firmware update target device type selected by the update target type selection part.

2. The firmware update apparatus according to claim 1, wherein each of the plurality of audio processing devices belongs to one of a plurality of device groups and the firmware update apparatus further comprises
a device group specification part that specifies one firmware update target device group from among the plurality of device groups based on a manipulation by the user, and
wherein the firmware update instruction part transmits the update command to one or more audio processing devices belonging to the one firmware update target device group specified by the device group specification part and also belonging to the firmware update target device type selected by the update target type selection part.

3. The firmware update apparatus according to claim 1, further comprising a version number selection part that lists for each of the plurality of device types, one or more of version numbers having compatibility with the firmware stored in the reference device based on the matching table, and selects an update goal version number from the listed version numbers for each of the plurality of device types based on a manipulation by the user.

4. A non-transitory machine readable storage medium that stores a program for use in a firmware update apparatus which communicates with a plurality of audio processing devices, each audio processing device being classified as one of a plurality of device types and transmitting or receiving an audio signal over a network to or from another audio processing device, and which updates a firmware stored in each of the plurality of audio processing devices,
the firmware being a control program for controlling the audio processing device, the firmware update apparatus including a processor and a matching table storage that stores a matching table defining a combination of compatible version numbers of firmwares from among combinations of version numbers of firmwares, wherein the program is executable by the processor for causing the firmware update apparatus to perform:
a reference device specifying process that specifies one of the plurality of audio processing devices as a reference device based on a manipulation by a user;
a version number acquisition process that acquires version numbers of firmwares stored in the audio processing devices from the audio processing devices;
an incompatible device display process that performs display for specifying an audio processing device that stores a firmware that does not satisfy compatibility defined in the matching table with a firmware stored in the reference device;
an update target type selection process that specifies a firmware update target device type from among the plurality of device types based on a manipulation by the user; and
a firmware update instruction process that transmits an update command to one or more audio processing devices belonging to the firmware update target device type selected by the update target type selection process.

5. A firmware update apparatus which communicates with a plurality of audio processing devices, each audio processing device belonging to one of a plurality of device groups, and which updates a firmware stored in each of the audio processing devices, the firmware being a control program for controlling the audio processing device,
each of the audio processing devices including a first network interface for communicating with another audio processing device within a device group to which the audio processing device belongs, each of the audio processing devices transmitting or receiving an audio signal to or from another audio processing device within the device group through the first network interface,
at least one audio processing device of each of the device groups including a second network interface for communicating with an audio processing device belonging to another device group, the at least one audio processing device transmitting or receiving an audio signal to or from an audio processing device belonging to another device group through the second network interface to perform audio signal communication between the plurality of device groups, the firmware update apparatus comprising:
- a device group specification part that specifies a device group, whose firmware is to be updated, as an update target device group from among the plurality of device groups based on a manipulation by a user;
- an update target device selection part that selects one or more audio processing devices belonging to the update target device group as one or more update target devices based on a manipulation by the user;
- an inter-group interface update specification part that specifies whether or not to update a firmware associated with the second network interface based on a manipulation by the user; and
- a firmware update instruction part that transmits an update command instructing update of firmwares of the update target devices,
- provided that information including the firmware associated with the second network interface, the interface has been set by the inter-group interface update specification part, and that transmits an update command instructing update of firmwares of the update target devices,
- excluding the firmware associated with the second network interface, to each of the update target devices, provided that information indicating update of the firmware associated with the second network interface has not been set by the inter-group interface update specification part.

6. The firmware update apparatus according to claim 5, further comprising:
- a reference device specification part that specifies one of the plurality of audio processing devices belonging to the update target device group as a reference device based on a manipulation by the user;
- a version number acquisition part that acquires version numbers of firmwares stored in the audio processing devices belonging to the update target device group from the audio processing devices belonging to the update target device group;
- a matching table storage that stores a matching table defining a combination of compatible version numbers of firmwares from among combinations of the version numbers of firmwares; and
- an incompatible device display part that performs display for specifying an audio processing device that stores a firmware that does not satisfy compatibility defined in the matching table with a firmware stored in the reference device from among the audio processing devices belonging to the update target device group.

7. A non-transitory machine readable storage medium containing a program for use in a firmware update apparatus which communicates with a plurality of audio processing devices, each audio processing device belonging to one of a plurality of device groups, and which updates a firmware stored in each of the plurality of audio processing devices, the firmware being a control program for controlling the audio processing device,
- each of the audio processing devices including a first network interface for communicating with another audio processing device within a device group to which the audio processing device belongs, each of the audio processing devices transmitting or receiving an audio signal to or from another audio processing device within the device group through the first network interface,
- at least one audio processing device of each of the device groups including a second network interface for communicating with an audio processing device belonging to another device group, the at least one audio processing device transmitting or receiving an audio signal to or from an audio processing device belonging to another device group through the second network interface to perform audio signal communication between the plurality of device groups,
- the firmware update apparatus including a processor and a matching table storage that stores a matching table defining a combination of compatible version numbers of firmwares from among combinations of version numbers of firmwares, wherein the program is executable by the processor for causing the firmware update apparatus to perform:
- a device group specification process that specifies a device group, whose firmware is to be updated, as an update target device group from among the plurality of device groups based on a manipulation by a user;
- an update target device selection process that selects one or more audio processing devices belonging to the update target device group as one or more update target devices based on a manipulation by the user;
- an inter-group interface update specification process that specifies whether or not to update a firmware associated with the second network interface based on a manipulation by the user; and
- a firmware update instruction process that transmits an update command instructing update of firmwares of the update target devices,
- including the firmware associated with the second network interface, to each of the update target devices, provided that information indicating update of the firmware associated with the second network interface has been set in the inter-group interface update specification process, and
- that transmits an update command instructing update of firmwares of the update target devices, excluding the firmware associated with the second network interface, to each of the update target devices, provided that information indicating update of the firmware associated with the second network interface has not been set in the inter-group interface update specification process.

* * * * *